Jan. 31, 1956  K. A. BLEWETT  2,733,330
WELDER'S WORK STAND
Filed March 12, 1954  2 Sheets-Sheet 2
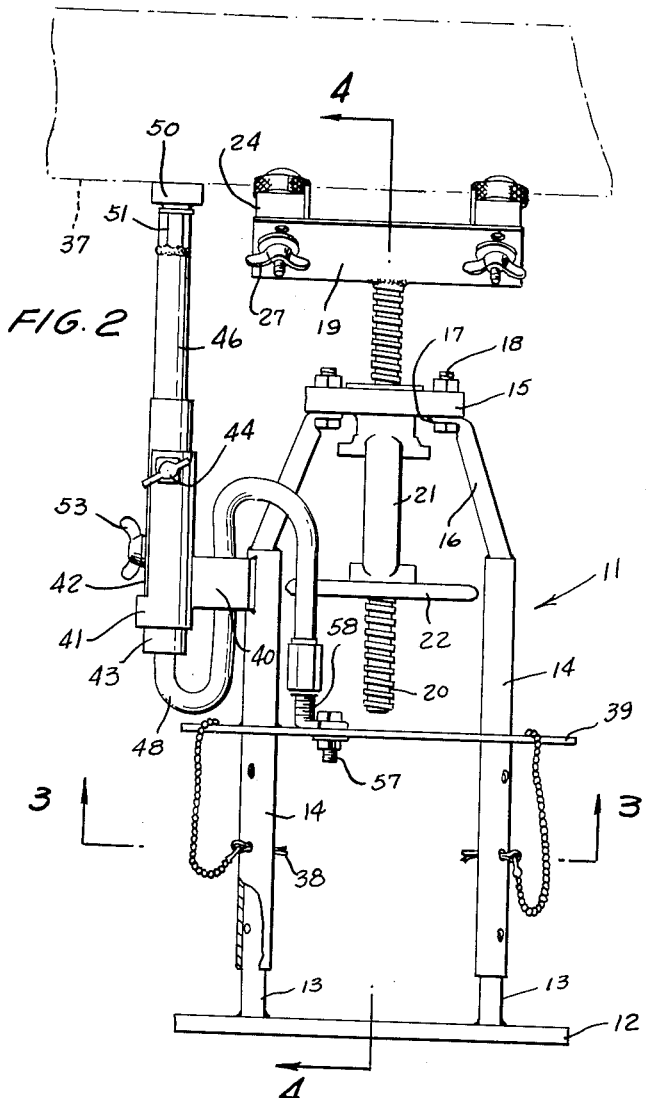
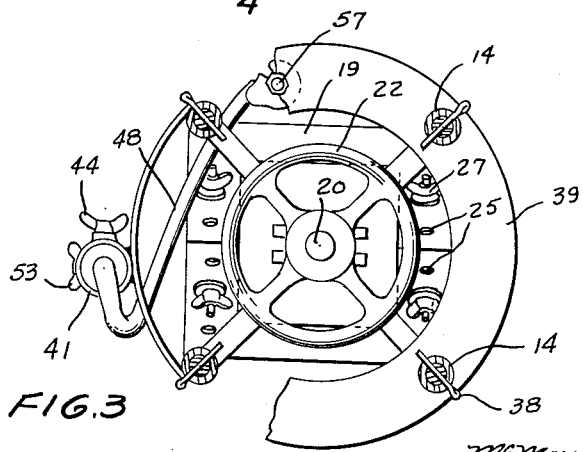
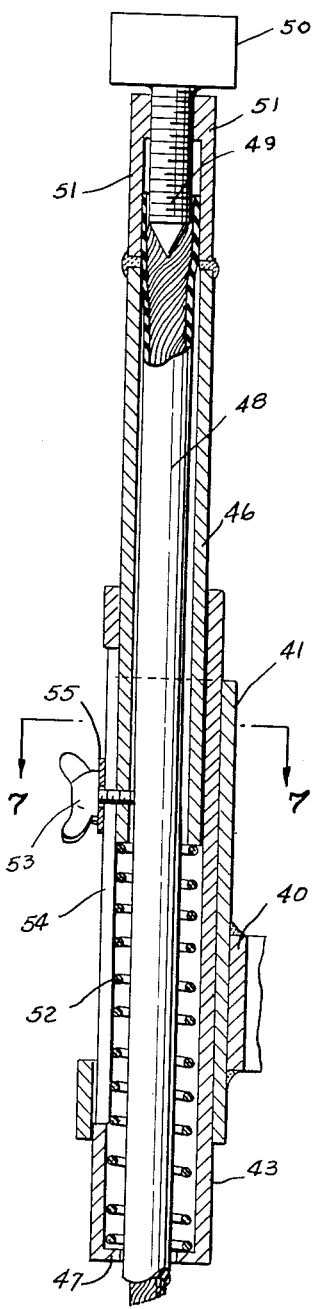
INVENTOR.
KIRBY A. BLEWETT
BY
McMorrow, Berman + Davidson
ATTORNEYS

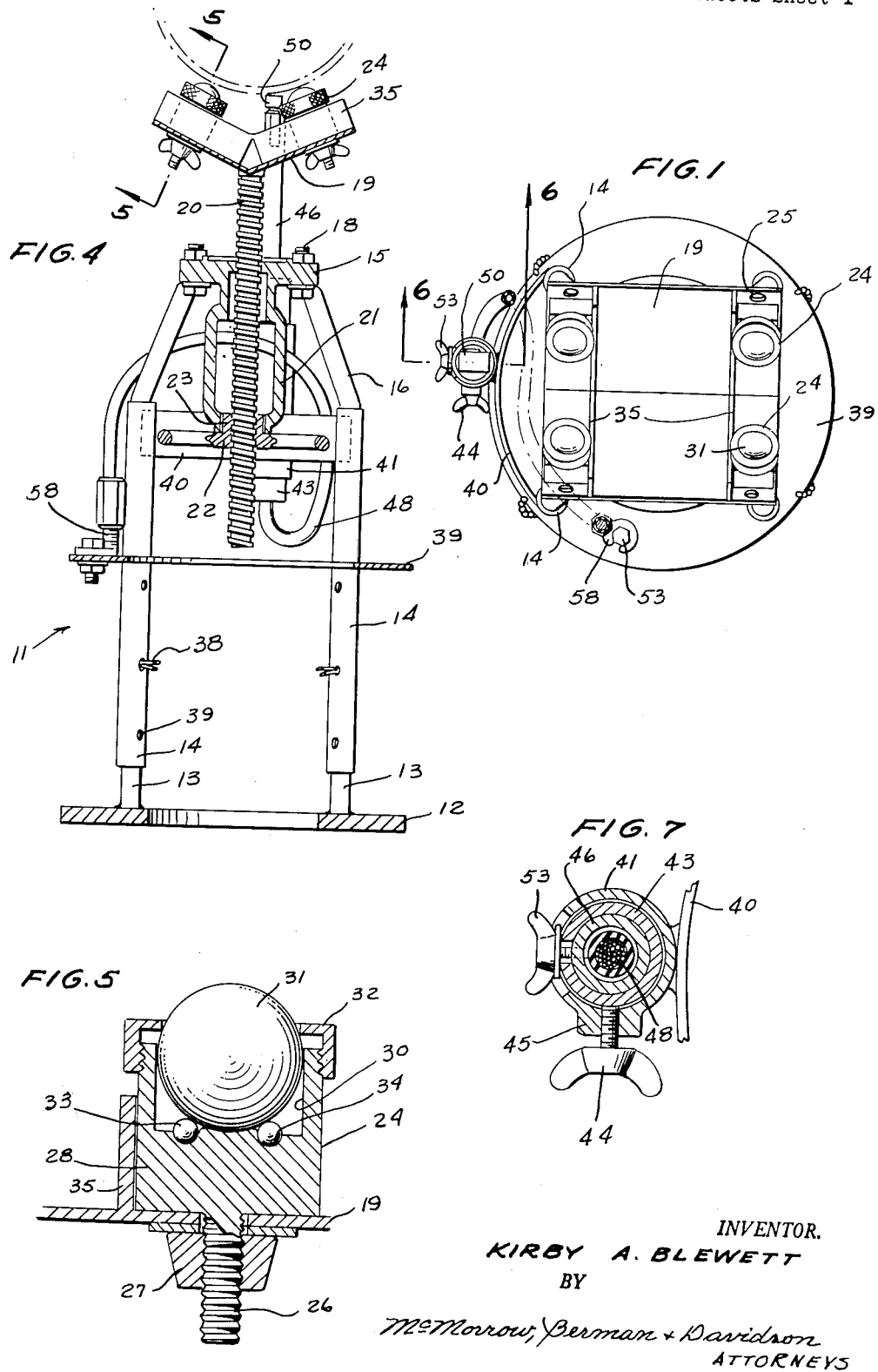

United States Patent Office 2,733,330
Patented Jan. 31, 1956

2,733,330

WELDER'S WORK STAND

Kirby A. Blewett, Corpus Christi, Tex.

Application March 12, 1954, Serial No. 415,862

2 Claims. (Cl. 219—17)

This invention relates to work supporting devices, and more particularly to an improved work stand for supporting work pieces during welding operations, for example, for supporting the end portions of sections of pipe being butt welded.

The main object of the invention is to provide a novel and improved work-supporting stand to be used in welding, said stand being simple in construction, being easy to adjust to desired height, and providing a substantially positive ground connection between the work piece being welded and the stand.

A further object of the invention is to provide an improved work-supporting stand for use in welding, for example, in butt welding the end portions of sections of pipes together, said stand involving inexpensive components, being easy to manufacture, being accurately adjustable in height, and being provided with an adjustable automatic grounding device for grounding the work piece to the stand.

Further objects and advantages of the invention will become apparent from the following description and claims, and from the accompanying drawings, wherein:

Figure 1 is a top view of an improved welder's work stand constructed in accordance with the present invention.

Figure 2 is a side elevational view of the work stand of Figure 1.

Figure 3 is a horizontal cross sectional view taken on the line 3—3 of Figure 2.

Figure 4 is a vertical cross sectional view taken on the line 4—4 of Figure 2.

Figure 5 is an enlarged cross sectional detail view taken on the line 5—5 of Figure 4.

Figure 6 is an enlarged cross sectional detail view taken on the line 6—6 of Figure 1.

Figure 7 is a cross sectional detail view taken on the line 7—7 of Figure 6.

Referring to the drawings, the improved welder's work-supporting stand is designated generally at 11 and comprises a base plate 12 of any suitable shape, for example, of annular shape, to which is rigidly secured the upstanding elements or post members 13. A large collar member 15 is carried by the upper ends of the elements or post members 13. Specifically, telesopically engaged over the post members 13 are the respective vertical sleeve members 14 which are rigidly connected at their top ends in any suitable manner to the large collar member 15. For example, the sleeve members 14 may have rigidly secured thereto the upwardly and inwardly inclined arms 16 formed at their top ends with the horizontal apertured lugs 17 which are fastened to the peripheral flange of the collar member 15 by the bolts 18.

A work supporting member 19 is positioned above and spaced from the collar member 15, and a stud 20 is dependingly carried by the work supporting member and is connected to the collar member for up and down movement. Specifically, the work supporting member 19 is a V-shaped plate element having rigidly secured to the intermediate portion of its apex the depending threaded stud 20 which is threadedly engaged with the collar member 15. As shown in Figure 4, the threaded stud 20 extends axially through the collar member 15 and extends axially through a depending housing sleeve 21 formed integrally with said collar member. Threadedly engaged on the lower portion of the stud 20 is a clamping nut element 22 in the form of a hand wheel having a reduced portion 23 adapted to enter the lower end of the housing sleeve 21 and being engageable with the bottom rim of said housing sleeve so that, as shown in Figure 4, when the nut member 22 is tightened, the stud 20 is locked with respect to the collar member 15.

The V-shaped plate member 19 is substantially rectangular in plan, and secured to said plate member substantially at its corner portions are the respective ball bearing units 24, the plate member being provided with spaced apertures 25 which are spaced outwardly from the longitudinal center plane of the plate member 19 at different distances so that the bearing unit 24 may be secured to the plate member at desired distances from said vertical central plane, the bearing units being provided with depending studs 26 which are engageable through selected apertures 25 and which are provided with wing nuts 27 for securing the bearings units to the plate member 19.

As shown in Figure 5, each bearing unit 24 comprises a main body 28 which is generally cup-shaped, and which has the depending stud 26 axially secured thereto. The cup member 28 is provided with the recess 30 in which the relatively large bearing ball 31 is rotatably seated, the bearing ball 31 being retained in the recess 30 by the annular retaining collar 32 which is threadedly engaged on the upper portion of the cup-like body 24, as is clearly shown in Figure 5. Smaller ball bearings 33 are provided in an annular raceway 34 formed in the bottom of cup-like member 28 around the large ball 31 to facilitate the rotation of the ball 31.

The bearing balls 31 are rotatable in all directions, allowing easy movement of the pipe or other work piece supported thereon vertically as well as horizontally.

The plate member 19 is provided with respective transversely extending upstanding brace flanges 35 located inwardly adjacent the ball bearings units 24 at the opposite ends of the plate member 19.

As shown in Figures 2 and 4, the upper portion of the work-supporting member is adapted to supportingly receive a work piece to be welded, for example, the end portion of a section of pipe shown in dotted view at 37, the work piece being supported on the balls 31 of the bearing units 24 in the manner clearly illustrated in Figure 4.

The telescopic sleeves 14 may be vertically adjusted relative to the upstanding post members 13 and secured in fixed adjusted positions relative to said upstanding posts by means of cotter pins 38 extending through selected apertures 39 in the sleeves 14 and through corresponding apertures provided in the upstanding posts 13. The depending sleeves 14 are rigidly supported at their upper portions by an annular ring 39 through which said sleeves extend and to which the sleeves are welded.

Welded to the top portions of a pair of sleeves 14 are the respective ends of an arcuate bar member 40 which is bowed outwardly, as shown in Figure 2, and which has rigidly secured to its intermediate portion the vertical sleeve member 41. The sleeve member 41 is formed at its outer side with a vertical slot 42 extending for the major portion of the length of the sleeve member and opening at the top thereof. Slidably received in the sleeve member 41 is a vertical tubular member 43 which is secured in vertically adjusted position in the sleeve member 41 by a wing set screw 44 threadedly engaged through a boss 45 provided at the top portion of the sleeve member 41 and which clampingly engages the sleeve member 43, as is clearly shown in Figure 7. Slidably received in the sleeve member 43 is an inner sleeve 46. Sleeve member 43 is provided with the annular bottom wall 47 through which extends the ground cable 48, the top end of the ground cable being engaged by the pointed depending shank 49 of a ground contact element 50. The shank 49 is threadedly engaged with the top portions of a plurality of finger elements 51 welded to the top end of the inner sleeve 46 and being spaced around the axis of said inner sleeve, as shown in Figures 2 and 6. By thus providing the spaced upstanding finger elements 51 at the top end of the inner sleeve 46, the point 49 of the contact member 50 may be engaged in the top end of the cable 48 by advancing the threaded shank 49 downwardly relative to the finger element 51, causing the top portion of the cable to be spread apart and to be wedgingly engaged against the finger elements 51, the finger elements 51 exerting a clamping reaction on the top portion of the cable.

A coiled spring 52 surrounds the lower portion of the cable in the sleeve 43 and acts between the bottom wall 47 and the bottom edge of the inner tubular member 46 to bias said tubular member 46 upwardly. A wing screw 53 is threaded through the lower portion of the inner sleeve 46 and extends through a vertical slot 54 provided in the sleeve member 43. A clamping washer 55 is provided on the wing screw 53, whereby the inner sleeve 46 may be clamped in vertically adjusted position relative to the sleeve member 43.

As shown in Figure 2, the cable 48 extends upwardly inside the arcuate bar member 40 and thence downwardly, being connected to a lug 58 which is conductively secured to the annular member 39 by a bolt 57.

In using the device, the work piece is supported on the bearing balls 31 in the manner illustrated in Figures 2 and 4, and the ground contact member 50 is allowed to engage the work piece by suitably adjusting the sleeves 43 and 46. The wing screw 53 is loosened, allowing the inner sleeve 46 to be urged upwardly by spring 52 to cause the contact element 50 to firmly engage the work piece 37, so as to provide a conductive ground connection for the work piece. The wing screw 53 is then tightened.

It will be understood that the plate member 19 is previously adjusted to the desired height and locked in its adjusted position by means of the locking wheel 22.

As is well understood, in a welding machine, a positive and a negative cable are provided, commonly called the "lead" and "ground" cables. The welding rod is attached to the end of the positive or "lead" cable and the negative or ground cable is attached to the material that is to be welded. By applying the rod to the material, an electrical welding circuit is created, whereby the rod is melted and whereby the weld may be accomplished.

The present method now in use with respect to pipe welding is to fasten the end of the ground cable to the end of the pipe with the clamp, or in some cases, the ground cable is spotwelded to the pipe to assure a perfect connection. This operation is necessary for each welding job.

By using the device of the present invention, the ground connection to the work piece is obtained by means of the contact of the element 50 with the work piece, in the manner above described.

The device of the present invention is designed primarily to facilitate the production of accurate butt welds of pipe sections. The work-supporting devices may be utilized in groups of three units, a respective unit being employed to support the opposite ends of two sections of pipe to be joined and a third unit being employed to support the butting pipe ends to be welded. As above pointed out, accurate vertical adjustment of the heights of the pipe ends can be readily achieved by use of the device of the present invention.

While a specific embodiment of an improved welding support for a work piece has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A welder's work stand comprising a base of conductive material, upstanding elements on said base, a collar member carried by the upper ends of said upstanding elements, a work supporting member positioned above and spaced from said collar member, a stud dependingly carried by said work supporting member and connected to said collar member for vertical up and down movement, means operatively connected to said stud for effecting the up and down movement of the latter, a vertical ground sleeve secured to said base, a conductive contact plunger slidably mounted in said sleeve, flexible cable means electrically connecting said contact plunger to said base, spring means biasing said plunger upwardly toward a position adjacent the upper portion of said work-supporting member, whereby said plunger will engage a work piece positioned on said work-supporting member, and means for releasably clamping said plunger in a fixed position relative to said sleeve, the top portion of said work-supporting member comprising a V-shaped plate element and a plurality of ball bearing members mounted on said plate element, said ball bearing members being spaced on opposite sides of the apex line of said V-shaped plate element.

2. A welder's work stand comprising a base of conductive material, a work-supporting member, a plurality of vertical depending members on said work-supporting member, upstanding elements on said base telescopically engaged with said depending members, means securing said upstanding elements to said depending members in fixed relation thereto, a vertical ground sleeve secured to said base, a conductive contact plunger slidably mounted in said sleeve, flexible cable means electrically connecting said contact plunger to said base, spring means biasing said plunger upwardly toward a position adjacent the upper portion of said work-supporting member, whereby said plunger will engage a work piece positioned on said work-supporting member, and means for releasably clamping said plunger in a fixed position relative to said sleeve, the top portion of said work-supporting member comprising a channeled plate element, a depending threaded stud secured to said top portion and threadedly engaged with the lower portion of said work-supporting member, whereby said top portion may be adjusted vertically relative to said lower portion, clamping nut means on said stud engageable with said lower portion to lock said top portion in adjusted position, and a plurality of ball bearing members mounted on the side marginal portions of said plate element.

References Cited in the file of this patent

UNITED STATES PATENTS

| | | |
|---|---|---|
| 598,960 | Rowland | Feb. 15, 1898 |
| 1,886,524 | Chapman | Nov. 8, 1932 |
| 2,143,411 | Ehret | Jan. 10, 1939 |
| 2,178,877 | Marvin | Nov. 7, 1939 |
| 2,550,159 | Mickelson | Apr. 24, 1951 |

FOREIGN PATENTS

| | | |
|---|---|---|
| 561,919 | Great Britain | June 9, 1944 |